US012739202B2

(12) United States Patent
Janardanan et al.

(10) Patent No.: US 12,739,202 B2
(45) Date of Patent: Sep. 15, 2026

(54) PROVIDING DUAL-HOMED, ACTIVE-ACTIVE DEVICES ON NETWORK FABRICS

(71) Applicant: Cisco Technology, Inc., San Jose, CA (US)

(72) Inventors: Raja Janardanan, Milpitas, CA (US); Sanjay Kumar Hooda, Pleasanton, CA (US); Prakash C. Jain, Fremont, CA (US); Ganesh Sankaranarayanan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 283 days.

(21) Appl. No.: 18/440,791

(22) Filed: Feb. 13, 2024

(65) Prior Publication Data

US 2025/0260645 A1 Aug. 14, 2025

(51) Int. Cl.

| | |
|---|---|
| ***H04L 45/16*** | (2022.01) |
| ***H04L 12/18*** | (2006.01) |
| ***H04L 45/00*** | (2022.01) |
| ***H04L 45/745*** | (2022.01) |
| *H04L 101/622* | (2022.01) |

(52) U.S. Cl.

CPC ............ *H04L 45/745* (2013.01); *H04L 12/18* (2013.01); *H04L 2101/622* (2022.05)

(58) Field of Classification Search

None

See application file for complete search history.

(56) References Cited

U.S. PATENT DOCUMENTS

| | | | | |
|---|---|---|---|---|
| 9,077,562 | B2 * | 7/2015 | Rajagopalan | H04L 45/16 |
| 11,811,658 | B1 * | 11/2023 | Golonka | H04L 45/566 |
| 2009/0175280 | A1 | 7/2009 | Berechya | |
| 2012/0014386 | A1 * | 1/2012 | Xiong | H04L 61/103 370/392 |
| 2012/0173694 | A1 | 7/2012 | Yan | |
| 2013/0151646 | A1 | 6/2013 | Chidambaram | |
| 2013/0294451 | A1 * | 11/2013 | Li | H04L 45/66 370/392 |
| 2017/0373936 | A1 * | 12/2017 | Hooda | H04L 63/08 |
| 2021/0359971 | A1 * | 11/2021 | Bhaskaran | H04L 61/5014 |
| 2021/0368004 | A1 | 11/2021 | Jain | |
| 2022/0311705 | A1 * | 9/2022 | Thubert | H04L 49/201 |

(Continued)

*Primary Examiner* — Christopher B Robinson

(74) *Attorney, Agent, or Firm* — Lee & Hayes, P.C.

(57) ABSTRACT

Techniques for edge nodes of a network fabric to identify L2 broadcast messages that have been looped through connections with dual-homed, active-active endpoints. The edge nodes receive an L2 broadcast message from the network fabric, and store a source MAC address of the message in a local map-cache. The edge devices then forward the L2 broadcast message to the endpoint. The edge nodes may receive the messages that have been looped through the connections with the endpoint, and compare the source MAC address of the messages with the source MAC addresses stored in the local map-cache. If the source MAC address of the message matches to an address in the local map-cache, the edge nodes drop the message. However, if the source MAC address does not match to an address in the local map-cache, the edge nodes add the source MAC address to a source MAC address table.

17 Claims, 10 Drawing Sheets

(56) References Cited

U.S. PATENT DOCUMENTS

| | | | | |
|---|---|---|---|---|
| 2023/0179439 | A1* | 6/2023 | Thubert | H04L 45/54 709/224 |
| 2023/0199465 | A1* | 6/2023 | Jain | H04W 8/005 455/435.1 |
| 2023/0308391 | A1 | 9/2023 | Jain | |
| 2024/0386054 | A1* | 11/2024 | Wouhaybi | H04L 45/16 |

* cited by examiner

300

SRC. ENDPOINT 106 / EDGE NODE 104

EDGE NODE 105

L2 SWITCH 114

CONTROL-PLANE NODE(S) 120

SEND FIRST L2 BROADCAST MESSAGE 302

STORE FIRST SOURCE MAC ADDRESS IN LOCAL MAP-CACHE 304

FORWARD FIRST L2 BROADCAST MESSAGE 306

RECEIVE SECOND L2 BROADCAST MESSAGE 308

DETERMINE WHETHER SECOND SOURCE MAC ADDRESS MATCHES WITH FIRST SOURCE MAC ADDRESS 310

400

4A

IDENTIFY, FROM THE SECOND L2 BROADCAST MESSAGE, A SECOND SOURCE MAC ADDRESS AND A DESTINATION MAC ADDRESS THAT IS A BROADCAST ADDRESS
412

DOES THE SECOND SOURCE MAC ADDRESS CORRESPOND TO THE FIRST SOURCE MAC ADDRESS?
414

YES

NO

DROP THE SECOND L2 BROADCAST MESSAGE
416

ADD THE SECOND SOURCE MAC ADDRESS TO A SOURCE MAC ADDRESS TABLE CORRESPONDING TO THE L2 DEVICE
418

PROVIDING DUAL-HOMED, ACTIVE-ACTIVE DEVICES ON NETWORK FABRICS

TECHNICAL FIELD

The present disclosure relates generally to techniques performed by edge nodes of a network fabric that forward and receive Layer-2 (L2) messages with dual-homed endpoints connected to the network fabric an active-active fashion.

BACKGROUND

Computer networks are collections of interconnected computers and other devices that communicate over connections to share information and resources among the connected devices. These networks include various types of network devices to communicate data and provide resources and services, such as routers, switches, firewalls, servers, endpoint devices, wireless controllers, and so forth. The physical and logical arrangement of a network through which the devices pass data to each other is often referred to as a "network fabric." There are various types of network fabrics, such as Local Area Networks (LANs) of endpoints or user devices, and Wide Area Networks (WANs) that provide between remote LANs and over large geographic areas.

Access networks are another type of network fabric that provide connectivity between end-users and core networks (or service providers), such as connecting endpoints and users to the Internet or service platforms (e.g., cloud-based platforms, software-as-a-service (SaaS) platforms, etc.). Examples of access networks may include campus area networks, enterprise networks, home networks, and mobile networks. Generally, access networks have edge nodes (or "edge routers") that facilitate the communication between the endpoints and the core network, as well as endpoint-to-endpoint communications. These edge nodes utilize various types of routing protocols in order to exchange information between the LANs or other autonomous networks, such as exchanging routes to endpoints located behind the edge routers and determining optimal network routes for data transmission across the access network.

Traditionally, the edge nodes have been connected to "single-homed" endpoints, which are endpoints that are connected to the access network through a single edge node. However, there are now "dual-homed" endpoints that are connected to multiple edge nodes for various reasons, such as failover mechanisms, load balancing, and high-availability. Additionally, these dual-homed endpoints can be operating in an active-active fashion where both network connections or interfaces on the dual-homed endpoints are available and actively transmitting and receiving data in order to improve performance, enable load balancing, and provide redundancy. However, various issues may arise when dual-homed devices are connected to an access network in an active-active fashion.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
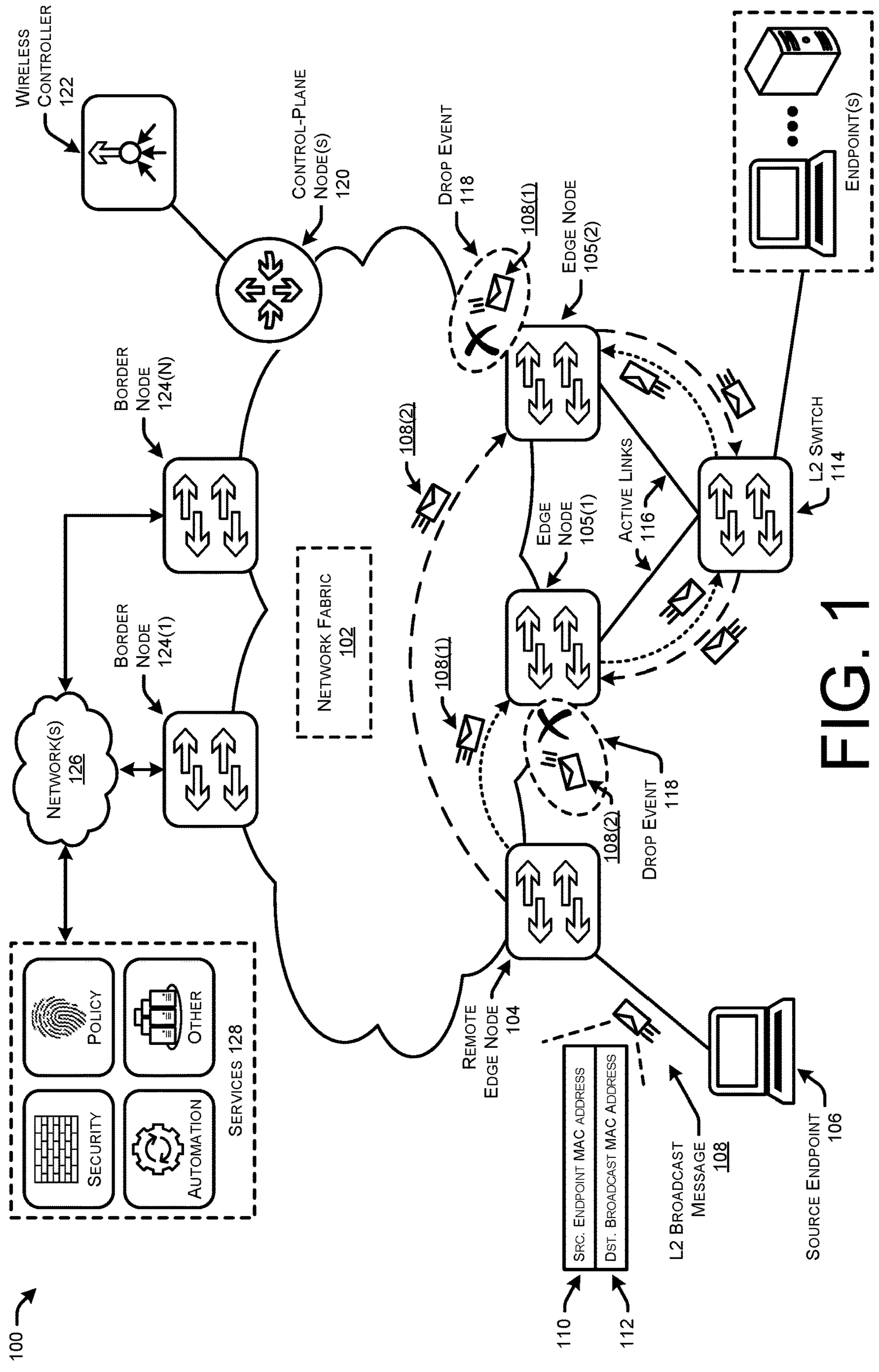
FIG. 1 illustrates a system-architecture diagram of an example network fabric having edge nodes that identify L2 broadcast messages that have already been communicated with dual-homed endpoints connected to the network fabric.

This disclosure describes techniques performed by edge nodes of a network fabric to identify L2 broadcast messages that have already been communicated with dual-homed endpoints connected to the network fabric an active-active fashion. A first method to perform techniques described herein includes receiving a first L2 broadcast message from a second edge node and over the network fabric, where the first L2 broadcast message originated at an endpoint that is connected to the second edge node. Further, the first method may include identifying, from the first L2 broadcast message, a first source media access control (MAC) address of the endpoint, and storing the first source MAC address of the first L2 broadcast message in a local cache of the first edge node. Additionally, the first method may include forwarding the first L2 broadcast message to an L2 device connected to the first edge node, where the L2 device is configured to access the network fabric via the first edge node and a third edge node. Even further, the first method may include receiving a second L2 broadcast message from the L2 device, and identifying, from the second L2 broadcast message, a second source MAC address and a destination MAC address that is a broadcast address. The first method may further include determining whether the second source MAC address corresponds to the first source MAC address stored in the local cache. In some instances, the first method may include, in response to determining that the second source MAC address corresponds to the first source MAC address, dropping the second L2 broadcast message. In other instances, the first method may include, in response to determining that the second source MAC address does not correspond the first source MAC address, adding the second source MAC address to a source MAC address table corresponding to the L2 device.

A second method to perform techniques described herein includes receiving a first L2 broadcast message from a second edge node and over the network fabric, where the first L2 broadcast message originated at an endpoint that is connected to the second edge node. Additionally, the second method may include identifying, from the first L2 broadcast message, a source media access control (MAC) address of the endpoint, and forwarding the first L2 broadcast message to an L2 device connected to the first edge node, wherein the L2 device is configured to access the network fabric via the first edge node and a third edge node. Further, the second method may include receiving a second L2 broadcast message from the L2 device, and determining that the second L2 broadcast message includes the source MAC address. The second method may additionally include, based at least in part the second L2 broadcast message including the source MAC address, dropping the second L2 broadcast message.

Additionally, the techniques described herein may be performed by a system and/or device having non-transitory computer-readable media storing computer-executable instructions that, when executed by one or more processors, performs the first and second methods described above.

EXAMPLE EMBODIMENTS

When edge nodes receive Layer 2 (L2) broadcast messages, the default behavior is to examine the destination MAC address, and if the destination MAC address is a broadcast address, the edge node will forward the L2 broadcast messages to all devices that are within the broadcast domain. This mechanism is helpful for tasks such as Address Resolution Protocol (ARP) resolution, where devices need to discover the MAC address associated with particular IP addresses within network segments. However, edge nodes may be connected to dual-homed endpoints, or endpoints that that are connected to multiple edge nodes for various reasons, such as failover mechanisms, load balancing, and high-availability. These dual-homed endpoints can be operating in an active-active fashion where both network connections or interfaces on the dual-homed endpoints are available and actively transmitting and receiving data in order to improve performance, enable load balancing, and provide redundancy.

However, dual-homed, active-active endpoints may cause various issues with L2 broadcast messages because the endpoints will receive L2 broadcast messages from one edge node, and forward those L2 broadcast messages to the other edge node. Consider an instance where each edge node receives an L2 broadcast message advertised across the network fabric, and each edge node forwards the L2 broadcast message to a dual-homed, active-active endpoint. The dual-homed, active-active endpoint will receive L2 broadcast messages from each edge node, and forward them back towards the different edge nodes. Thus, dual-homed, active-active endpoints can cause loops in L2 broadcast messages being forwarded between the connected edge nodes. The edge nodes will not know if the L2 broadcast message was originated at the endpoint, or if the L2 broadcast message is being looped back by the endpoint and the edge nodes have already processed the L2 broadcast message. This can result in various issues, such as endpoint identifiers (EIDs) being assigned to the wrong endpoints, and EID flap between different endpoints.

This disclosure describes techniques performed by edge nodes of a network fabric to identify L2 broadcast messages that have already been communicated with dual-homed endpoints connected to the network fabric an active-active fashion. The edge nodes that are connected to a dual-homed, active-active endpoint may receive an L2 broadcast message that has been sent over the network fabric, and identify the source MAC address of a remote endpoint that sent the L2 broadcast message. The edge nodes may then store the source MAC address in a local map-cache and forward the L2 broadcast message to the dual-homed, active-active endpoint via their active links. The edge nodes may then again receive the L2 broadcast message from the dual-homed, active-active endpoint due to the looping caused by the active-active links. When the edge nodes receive these L2 broadcast messages, the edge nodes may compare the source MAC address of the L2 broadcast messages with the source MAC addresses stored in the local map-cache. In response to determining that the source MAC address of the L2 broadcast message matches or corresponds to a source MAC address stored in the local map-cache, the edge nodes may drop the L2 broadcast message and refrain from forwarding the message because it has been looped by the endpoint. However, in response to determining that the source MAC address of the L2 broadcast message does not match or correspond to a source MAC address stored in the local map-cache, the edge nodes may add the source MAC address to a source MAC address table because the L2 broadcast message originated at an endpoint located behind the edge nodes.

Thus, using the local map-cache, the edge nodes are able to determine whether an L2 broadcast message has originated at an endpoint located behind the edge nodes and that are connected to the access fabric via the edge nodes, or if the L2 broadcast message is being looped through a dual-homed, active-active endpoint. Traditionally, edge nodes are configured to add a source MAC address to a source MAC address table for endpoints that are located behind the edge nodes, and further configured to send a registration message to a control-plane of the network fabric to register the endpoint with the edge nodes. However, in examples where the L2 broadcast message has a source MAC address that matches to a source MAC address in the local map-cache, the edge nodes may be configured to refrain from adding the source MAC address to the source MAC address table, and refrain from sending the registration message to the control-plane of the network fabric. Further, the edge nodes may be configured to add the source MAC address to flood map-cache tables stored in the edge nodes, where the flood map-cache tables stores source MAC addresses received in L2 broadcast messages that belong to endpoints which are registered to other edge nodes of the network fabric.

Additionally, in instances where the L2 broadcast message has a source MAC address that matches to a source MAC address in the local map-cache (e.g., looped L2 broadcast message), the edge nodes may query the control-plane to determine whether the endpoint is registered to another edge node of the network fabric. If the control-plane returns a reply that states that the MAC address is already registered by another edge node in the network fabric, the edge node may keep the MAC address in the flood map-cache table. However, if the control-plane returns a reply that states that the MAC address is not registered by another edge node in the network fabric, the edge node may remove the entry created in the flood map-cache table and clear the local map-cache as well for that entry. This ensures that a scenario where an endpoint legitimately moved from a remote edge node to a new edge node is handled appropriately and the MAC address of the endpoint is registered to the new edge node.

Although the techniques described herein are primarily with respect to a Locator/ID Separation Protocol (LISP), the techniques are applicable to other routing protocols, such as Border Gateway Protocol (BGP), Intermediate System to Intermediate System (IS-IS), ARP, Routing Protocols for Low-Power and Lossy Networks (RPL), and/or other protocols. Further, while the techniques are described with reference to a L2 broadcast message, the techniques may be applicable for a multicast message as well.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of an example network fabric 102 having edge nodes 104 that identify L2 broadcast messages 108 that have already been communicated with dual-homed endpoints connected to the network fabric 102. The network fabric 102 includes a mesh of connections between network devices such as access points, switches, and routers that transports data to its destination. The term "fabric" can mean the physical wirings that make up these connections, but may refer to a virtualized, automated lattice of overlay connections on top of the physical topology. The network fabric 102 may, include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

In some instances, the network fabric 102 may be an access fabric, and include the underlying network infrastructure within an organization that facilitates connectivity for endpoints 106 (e.g., end-user devices), enabling them to access various network services and resources. The access fabric may be primarily situated in the access layer of a hierarchical network architecture and serves as the entry point for devices connecting to a core network. In the context of software-defined access (SDA) fabrics, the fabric may refer to a network architecture where all the devices, including switches and routers, are interconnected and work together seamlessly. The fabric is "software-defined" because the control plane is abstracted from the physical infrastructure and is managed centrally through software. Thus, SDA fabrics include a network architecture that leverages software-defined networking (SDN) principles to simplify and automate network management, enhance security, and provide better visibility and control over network resources. SD-Access focuses on the access layer of the network, which is responsible for connecting end-user devices, such as computers, smartphones, and IoT devices, to the network.

As shown, the network fabric 102 may include a remote edge node 104 and edge nodes 105(1)-105(2), where the edge node 104 and edge nodes 105 may comprise any type of edge node, such as routers, switches, wireless access points (APs), customer premises equipment (CPE), gateway devices, and/or security appliances. The edge node 104 and edge nodes 105 ensure that connected devices, such as endpoints 106, L2 switches 114, etc., can connect to the network fabric 102, access services, and communicate with other devices in local and wider network infrastructures. As illustrated, the edge node 104 may be connected to a source endpoint 106 that generates a L2 broadcast message 108 to be sent over the network fabric. As shown, the L2 broadcast message may include a source endpoint MAC address that is a MAC address of the source endpoint 106, and also a destination broadcast MAC address (e.g., FF-FF-FF-FF-FF-FF) that is configured to reach every device on a network segment. The L2 broadcast message may be used to indicate a mapping between an Internet Protocol (IP) address and the source endpoint MAC address of the source endpoint 106.

In some instances, the network fabric and associated devices may use the LISP protocol rather than the IP protocol, where LISP generally separates the location and identity of a device through Routing Locators (RLOCs) and Endpoints Identifiers (EIDs). The RLOC represents the IP address of the egress tunnel router (ETR) (e.g., edge node the host is attached to, and the EID represents the IP address assigned to the host.

For network fabrics that use LISP, the Layer 2 broadcast message 108 may be sent over the network fabric to advertise the source endpoint MAC address as belonging to or mapping to an EID of the source endpoint 106. The L2 broadcast message 108 will be forwarded by devices of the network fabric 102 until the L2 broadcast message 108 reaches edge node 105(1) and edge node 105(2). As shown, edge node 105(1) and edge node 105(2) are each connected to an L2 switch 114 using active links 116. Thus, the L2 switch 114 may be a dual-homed, active-active endpoint. Although illustrated as an L2 switch 114, any type of device may be operating as the dual-homed, active-active device, such as user devices (e.g., desktop computers, laptop computers, phones, tablets, wearable devices, entertainment devices such as televisions, etc.), network devices (e.g., servers, routers, switches, access points, etc.), and/or any other type of computing device.

According to the techniques of this disclosure, edge node 105(1) and edge node 105(2) perform to identify L2 broadcast messages that have already been communicated with dual-homed endpoints connected to the network fabric an active-active fashion. The edge nodes 105 that are connected to a dual-homed, active-active endpoint may receive respective versions of the L2 broadcast message 108(1) and 108(2) that have been sent over the network fabric 102, and identify the source endpoint MAC address 110 of the source endpoint 106 that sent the L2 broadcast message 108. The edge nodes 105 may then store the source endpoint MAC address 110 in a local map-cache and forward the L2 broadcast message 108 to the L2 switch 114 via their active links 116.

Generally, the edge nodes 105 will forward the L2 broadcast message 108 to devices with active links 116, such as the L2 switch 114. As shown, the edge node 105(1) and edge node 105(2) both have active links 116 with the L2 switch 114, and each of the edge node 105(1) and edge node 105(2) will forward the L2 broadcast message 108 to the L2 switch 114. The L2 switch 114 is configured to forward the L2 broadcast message 108 on its active, egress active links 116. Thus, the L2 broadcast message 108(2) that is sent from the edge node 105(2) is forwarded by the L2 switch 114 to the edge node 105(1), and the L2 broadcast message 108(1) that is sent from the edge node 105(1) is forwarded to the edge node 105(2) from the L2 switch 114.

Thus, edge nodes 105 may then again receive the L2 broadcast message 108 from the L2 switch 114 due to the looping caused by the active links 116. When the edge nodes 105 receive these L2 broadcast messages 108, the edge nodes 105 may compare the source MAC addresses of the L2 broadcast messages 108 with the source endpoint MAC addresses stored in the local map-caches. In response to determining that the source MAC addresses of the L2 broadcast message 108 match or correspond to a source MAC address stored in the local map-caches, the edge nodes 105 may drop the L2 broadcast messages 108 (drop events 118) and refrain from forwarding the messages 108 because they have been looped by the L2 switch 114. However, in response to determining that the source MAC addresses of the L2 broadcast messages 108 do not match or correspond to a source MAC address stored in the local map-caches, the edge nodes 105 may add the source MAC addresses to source MAC address tables of the edge nodes 105 because the L2 broadcast message originated at an endpoint located behind the edge nodes 105. Generally, the edge nodes 105 uses this source MAC addresses to update the source MAC address tables, and the source MAC address tables are a database that associates MAC addresses with the specific ports on the switch to which devices are connected.

Thus, using the local map-cache, the edge nodes 105 are able to determine whether an L2 broadcast message 108 has originated at an endpoint located behind the edge nodes 105 (e.g., L2 switch 114) and that are connected to the network fabric 102 via the edge nodes 105, or if the L2 broadcast message 108 is being looped through a dual-homed, active-active endpoint (e.g., L2 switch 114). Traditionally, edge nodes 105 are configured to add a source MAC address to a source MAC address table for endpoints that are located behind the edge nodes 105, and further configured to send a registration message to a control-plane node 120 of the network fabric 102 to register the endpoint with the edge nodes 105. However, in examples where the L2 broadcast message 108 has a source MAC address that matches to a source MAC address in the local map-cache, the edge nodes 105 may be configured to refrain from adding the source MAC address to the source MAC address table, and refrain from sending the registration message to the control-plane nodes 120 of the network fabric 102. Further, the edge nodes 105 may be configured to add the source MAC address to flood map-cache tables stored in the edge nodes, where the flood map-cache tables stores source MAC addresses received in L2 broadcast messages 108 that belong to endpoints which are registered to other edge nodes (e.g., remote edge node 104) of the network fabric 102.

Additionally, in instances where the L2 broadcast message has a source MAC address that matches to a source MAC address in the local map-cache (e.g., looped L2 broadcast message), the edge nodes 105 may query the control-plane nodes 120 to determine whether the endpoint is registered to another edge node of the network fabric 102. If the control-plane nodes 120 return a reply that states that the MAC address is already registered by another edge node in the network fabric 102, the edge node 105 may keep the MAC address in the flood map-cache table. However, if the control-plane nodes 120 returns a reply that states that the MAC address is not registered by another edge node in the network fabric 102, the edge node 105 may remove the entry created in the flood map-cache table and clear the local map-cache as well for that entry. This ensures that a scenario where, for example, the source endpoint 106 legitimately moved from the remote edge node 104 to the edge node 105(1) is handled appropriately and the MAC address of the endpoint is registered to the edge node 105(1).

In examples where the network fabric uses a LISP routing framework, the control-plane nodes may be or include one or more Mapping System (MS)/Mapping Request (MS/MR) servers. The mapping system may be responsible for maintaining the mappings between EIDs and RLOCs, and stores information about how EIDs are currently mapped to specific RLOCs in the network fabric 102. The mapping system may be queried by LISP routers (e.g., edge nodes), specifically the Ingress Tunnel Router (ITR), to obtain the RLOC information associated with a particular EID when a data packet needs to be sent. The mapping request may be a message sent by an ITR (Ingress Tunnel Router) to the mapping system to query for the current mapping information of a specific EID. However, the control-plane nodes 120 may be other types of nodes depending on the protocol being used, such as route reflectors when the edge nodes utilize BGP or other protocols. The control-plane nodes 120 may be in communication with a wireless controller 122 that performs techniques for orchestrating wireless networking within the network fabric 102.

In some instances, the endpoints may utilize the edge nodes to communicate over the network fabric 102 to access one or more networks 126, which may be core networks. The network(s) 126 may, include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network(s) 126 may provide access to the endpoints to various services 128, such as security services, policy services, automation services, and/or other types of services.

Figure 2:
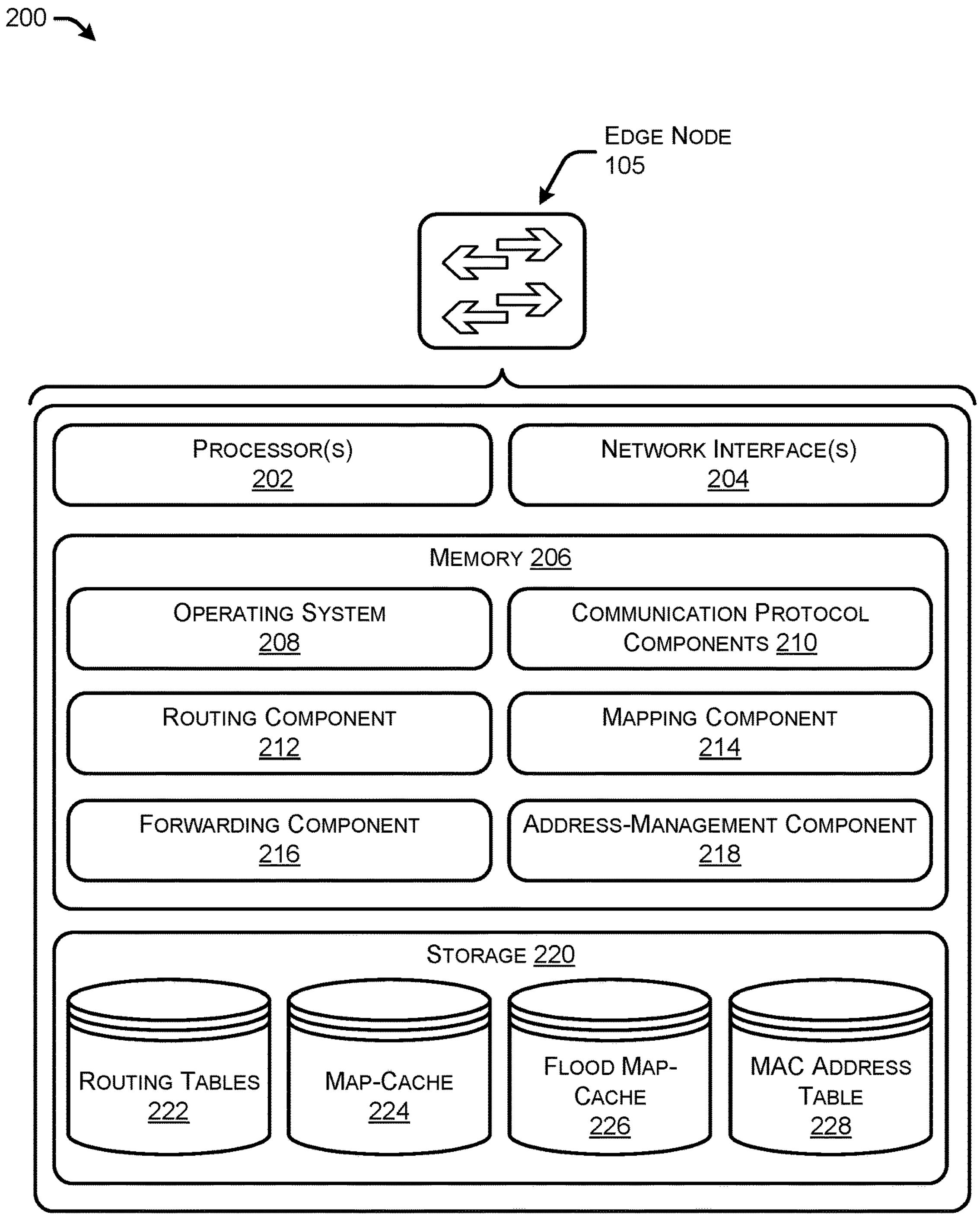
FIG. 2 illustrates a component diagram of an example edge node configured to perform techniques described herein.

FIG. 2 illustrates a component diagram 200 of an example edge node 105 configured to perform techniques described herein.

As illustrated, the edge node 105 may include one or more hardware processors 202 (processors), one or more devices, configured to execute one or more stored instructions. The processor(s) 202 may comprise one or more cores. Further, the edge node 105 may include one or more network interfaces 204 configured to provide communications between the edge node 105 and other devices, such as the L2 switch 114, remote edge node 104, and/or other network devices. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi™, cellular or mobile protocols, and so forth.

The edge node 105 may also include memory 206 (e.g., computer-readable memory) that stores various executable components (e.g., software-based components, firmware-based components, etc.). In addition to various components discussed in FIG. 1, the memory 206 may further store components to implement functionality described herein. The memory 206 may store one or more operating systems 208 utilized to control the operation of the one or more devices that comprise the edge node 105. According to one embodiment, the operating system comprises the LINUX operating system. According to another embodiment, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the edge node 105 may include storage 220 which may comprise one, or multiple, repositories or other storage locations for persistently storing and managing collections of data such as databases, simple files, binary, and/or any other data. The storage 220 may include one or more storage locations that may be managed by one or more database management systems.

The memory 206 may store one or more communication protocol components 210 that enable the edge node 105 to communicate using various communication protocols. The communication protocol components 210 enable effective communication between the edge node 105 and devices using communication stacks. This communication protocol components 210 facilitate the exchange of information by defining a set of rules and conventions that devices must follow during communication. Communication protocols specify how data is formatted, transmitted, received, and interpreted, and the communication protocol components 210 help the edge node 105 utilize communication stacks, which are layered structures of protocols, to establish reliable and standardized communication. Examples of communication protocols include LISP, BGP, TCP/IP (Transmission Control Protocol/Internet Protocol) for the Internet, Bluetooth for short-range wireless communication, and MQTT (Message Queuing Telemetry Transport) for lightweight messaging in IoT applications.

The memory 206 may store a routing component 212 that makes decisions on how to route data packets between different networks using the routing tables 222. The routing component 212 may determine the optimal path or route for data to travel from the source to the destination. Some of the key functions performed by the routing component 212 include: (i) maintaining routing tables 222, which are databases containing information about available routes and their associated metrics (such as cost, distance, or bandwidth), (ii) using the routing tables to determine the best path for forwarding the packet based on various factors, such as the destination IP address, network topology, and routing metrics, to select the optimal route, (iii) forwarding data packets to next hops along routes, and (iv) implementing routing protocols (e.g., RIP, LISP, OSPF, BGP) to exchange routing information with neighboring routers such as information about network topology changes and help build and update the routing tables.

The memory 206 may further store a mapping component 214 configured to store various mappings in caches of the storage 220, such as a map-cache 224. The mapping component 214 may store mappings between MAC addresses, Endpoint Identifiers (EIDs), and their associated Routing Locators (RLOCs). An EID represents the identity of a device, while the RLOC indicates the device's current location in the network.

The memory 206 may further store a forwarding component 216 that determines whether to forward L2 broadcast messages 108 using the techniques described herein and information in the map-cache 224. When the edge node 105 receives an L2 broadcast message 108, the forwarding component 216 may compare the source MAC addresses of the L2 broadcast messages 108 with the source endpoint MAC addresses stored in the local map-cache 224. In response to determining that the source MAC address of the L2 broadcast message 108 matches or corresponds to a source MAC address stored in the local map-cache 224, the forwarding component 216 may drop the L2 broadcast messages 108 (drop events 118) and refrain from forwarding the messages 108 because they have been looped by the L2 switch 114. However, in response to determining that the source MAC addresses of the L2 broadcast message 108 does not match or correspond to a source MAC address stored in the local map-cache 224, an address-management component 218 may add the source MAC addresses to a MAC address table 228 of the edge node 105 because the L2 broadcast message 108 originated at an endpoint located behind the edge node 105. Generally, the edge node 105 uses the source MAC addresses to update the MAC address table 228, and the source MAC address table 228 is a database that associates MAC addresses with the specific ports on the edge node 105 to which devices are connected.

In the context of the Locator/ID Separation Protocol (LISP), the local map-cache 224 plays a crucial role in facilitating efficient and optimized routing within a LISP-enabled network. The map-cache 2 is a data structure maintained by LISP devices, and the local map-cache 224 specifically refers to the mapping information stored locally on an individual edge node 105. The local map-cache 224 stores mappings between Endpoint Identifiers (EIDs) and their associated Routing Locators (RLOCs). An EID represents the identity of a device, while the RLOC indicates the device's current location in the network. When an edge node 105 receives a packet destined for an EID, it consults its local map-cache 224 to determine the corresponding RLOC for that EID. This information is crucial for making forwarding decisions. If the mapping is found in the local map-cache 224, the edge node 105 can quickly and efficiently forward the packet based on the stored RLOC. The local map-cache 224 is queried during the process of forwarding packets. The edge node 105 checks whether it has a valid and up-to-date mapping for the destination EID. If the mapping is present, it avoids the need to query a Map-Resolver or Map-Server (e.g., control-plane nodes 120) for mapping information, reducing latency and improving packet forwarding efficiency. Each entry in the local map-cache 224 has a Time-to-Live (TTL) associated with it. The TTL indicates how long the mapping information is considered valid. The local map-cache 224 is responsible for managing and updating TTL values to ensure that mappings are refreshed and kept current. In dynamic networking environments, device mobility, network changes, or updates in mapping information may occur. The local map-cache 224 is designed to handle dynamic updates, refreshing mappings based on TTL values and adapting to changes in the network.

Figure 3A:
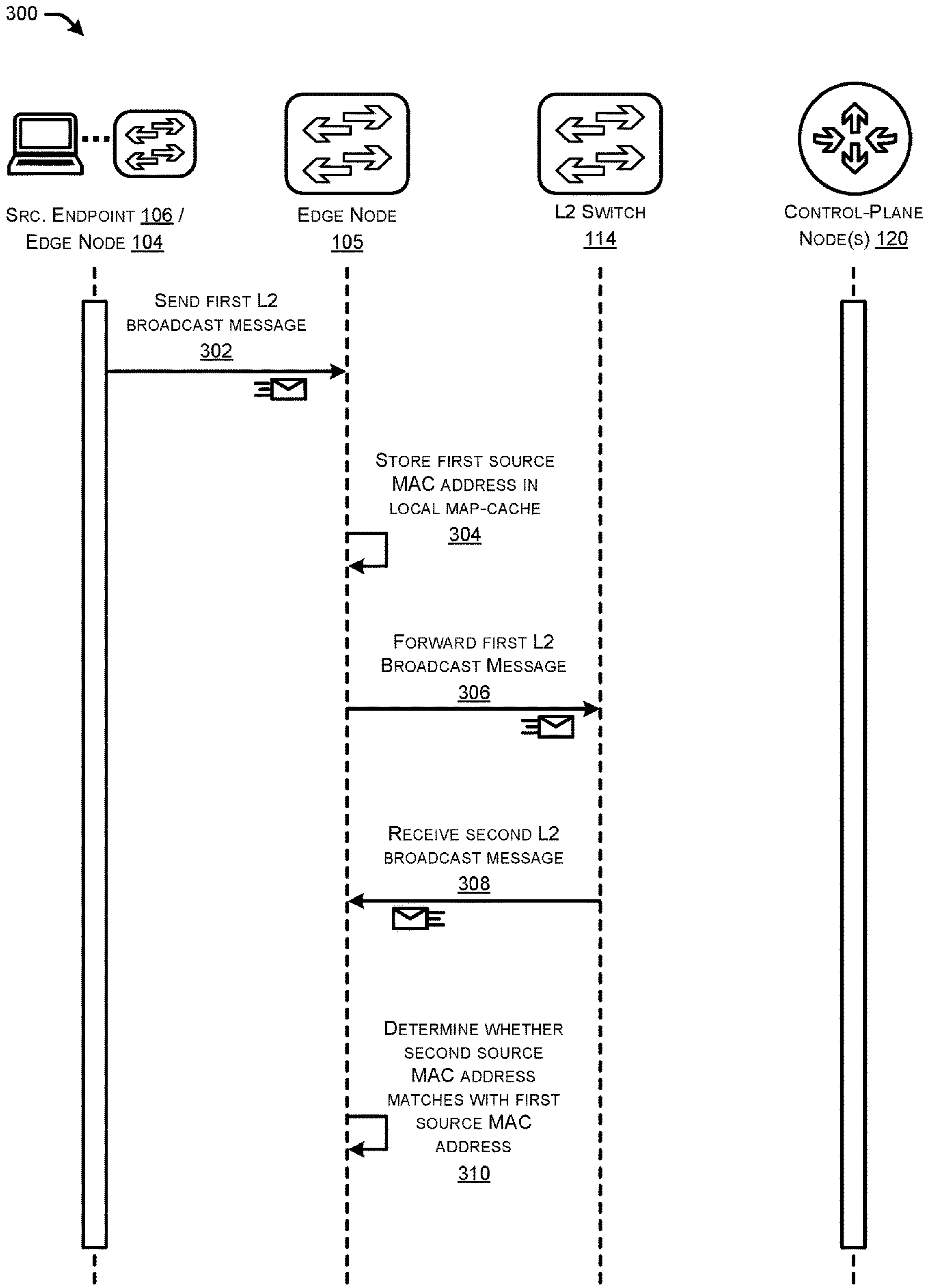
FIGS. 3A and 3B collectively illustrate a flow diagram of an example method for edge nodes in a network fabric to identify L2 broadcast messages that have already been communicated with dual-homed endpoints connected to the network fabric.
Figure 3B:
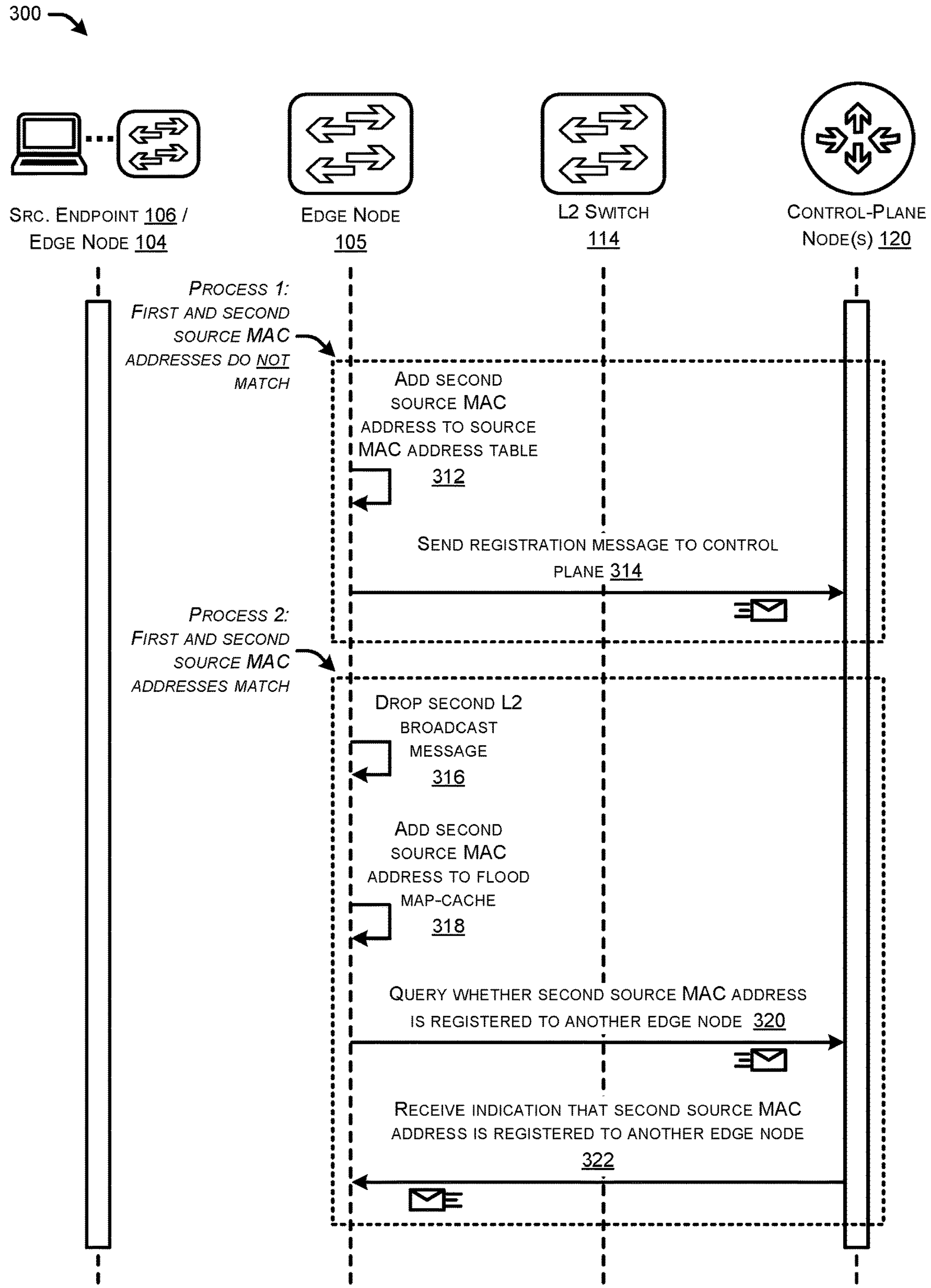

FIGS. 3A and 3B collectively illustrate a flow diagram of an example method 300 for edge nodes 105 in a network fabric 102 to identify L2 broadcast messages 108 that have already been communicated with dual-homed endpoints connected to the network fabric 102.

At 302, the edge node 104 may send a first L2 broadcast message 108 to an edge node 105. The first L2 broadcast message 108 may have been generated by the source endpoint 106 and include a source endpoint MAC address 110 of the source endpoint 106.

At 304, the edge node 105 may receive the first L2 broadcast message 108 and store the first source endpoint MAC address 110 in a local map-cache 224 based on the local map-cache 224 not having an existing entry for the first source endpoint MAC address 110. At 306, the edge node 105 may forward the first L2 broadcast message 108 to the L2 switch 114 (or another endpoint), and receive a second L2 broadcast message 108 at 308 from the L2 switch 114.

At 310, the edge node 105 may determine whether the second source MAC address matches with any MAC addresses stored in the local map-cache 224. At 312, in response to determining that the second MAC address does not match with an MAC addresses stored in the local map-cache 224, the edge node 105 may add the second source MAC address to the MAC address table 228. Further, at 314, the edge node 105 may send a registration message to the control-plane nodes 120 to register the source endpoint 10.

However, in response to determining that the second MAC address does match with a MAC address stored in the local map-cache 224, the edge node 105 may drop the second L2 broadcast message 108 at 316. Further, the edge node 105 may, at 318, add the second source MAC address to a flood map-cache 226, and at 320, query the control-plane nodes 120 as to whether the second source MAC address is registered to another edge node for confirmation. At 322, the edge node 105 may receive an indicating that the second source MAC address is registered to another edge node and verify the determination that the second L2 broadcast message 108 was a looped message. However, the control-plane nodes 120 may in some instances indicate that the second source MAC address is not registered to another edge node, and in such an example, the edge node may clear the map-cache 224 and flood map-cache 226 entries for that MAC address and add the MAC address to the MAC address table 228.

Figure 4A:
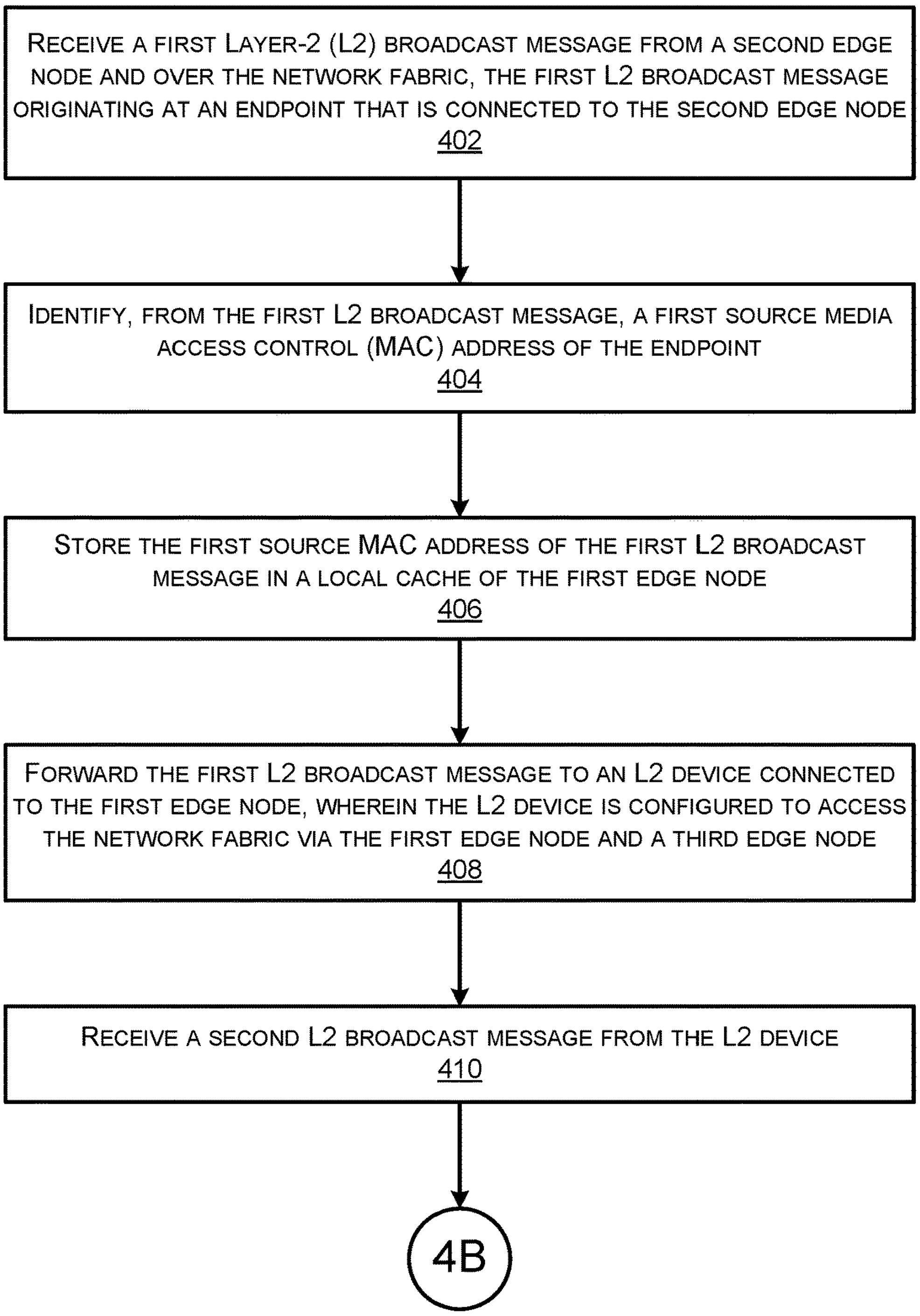
FIGS. 4A and 4B collectively illustrate a flow diagram of an example method for edge nodes in a network fabric to determine whether L2 broadcast messages have already been communicated with dual-homed endpoints connected to the network fabric.
Figure 4B:
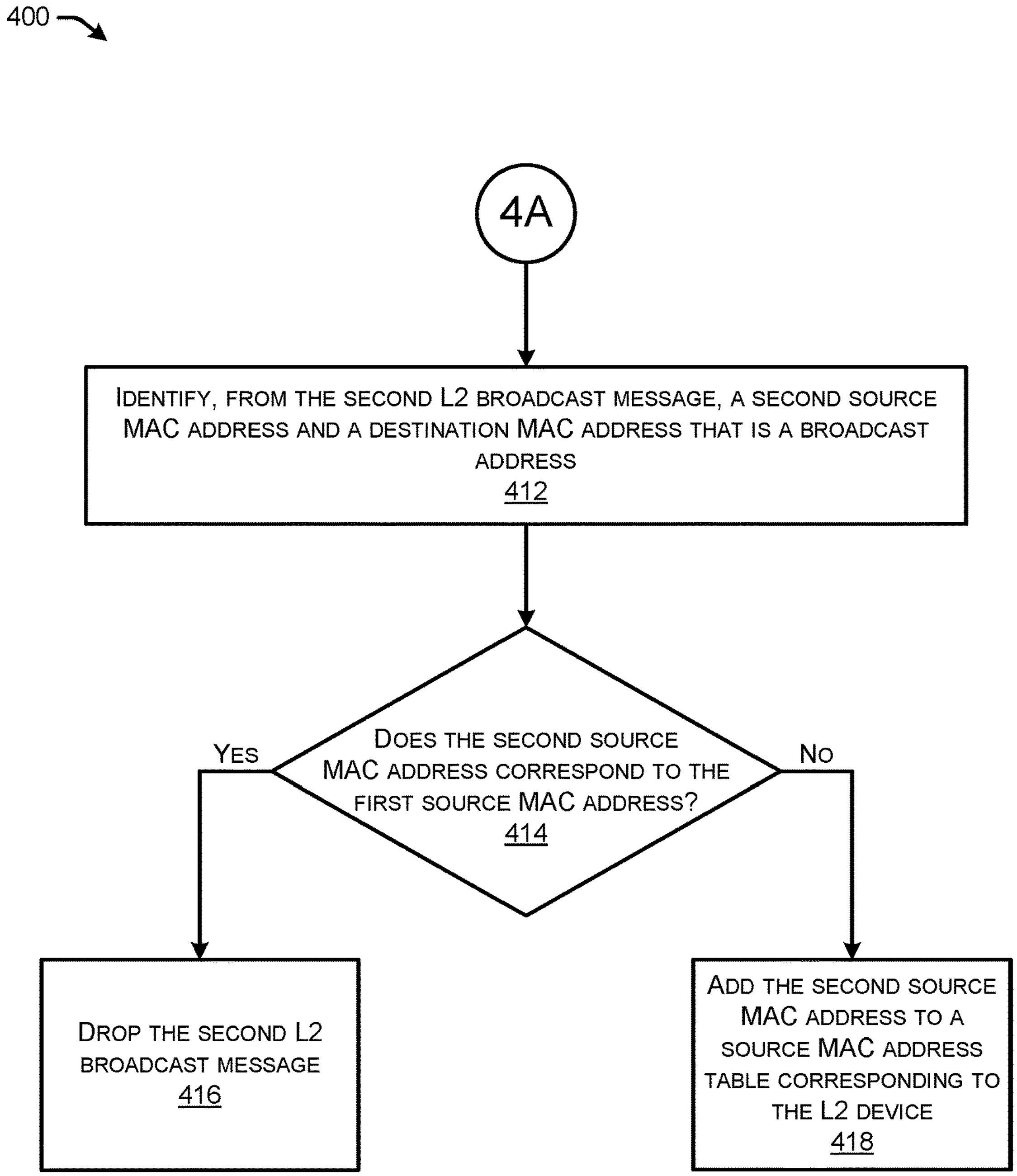
Figure 5:
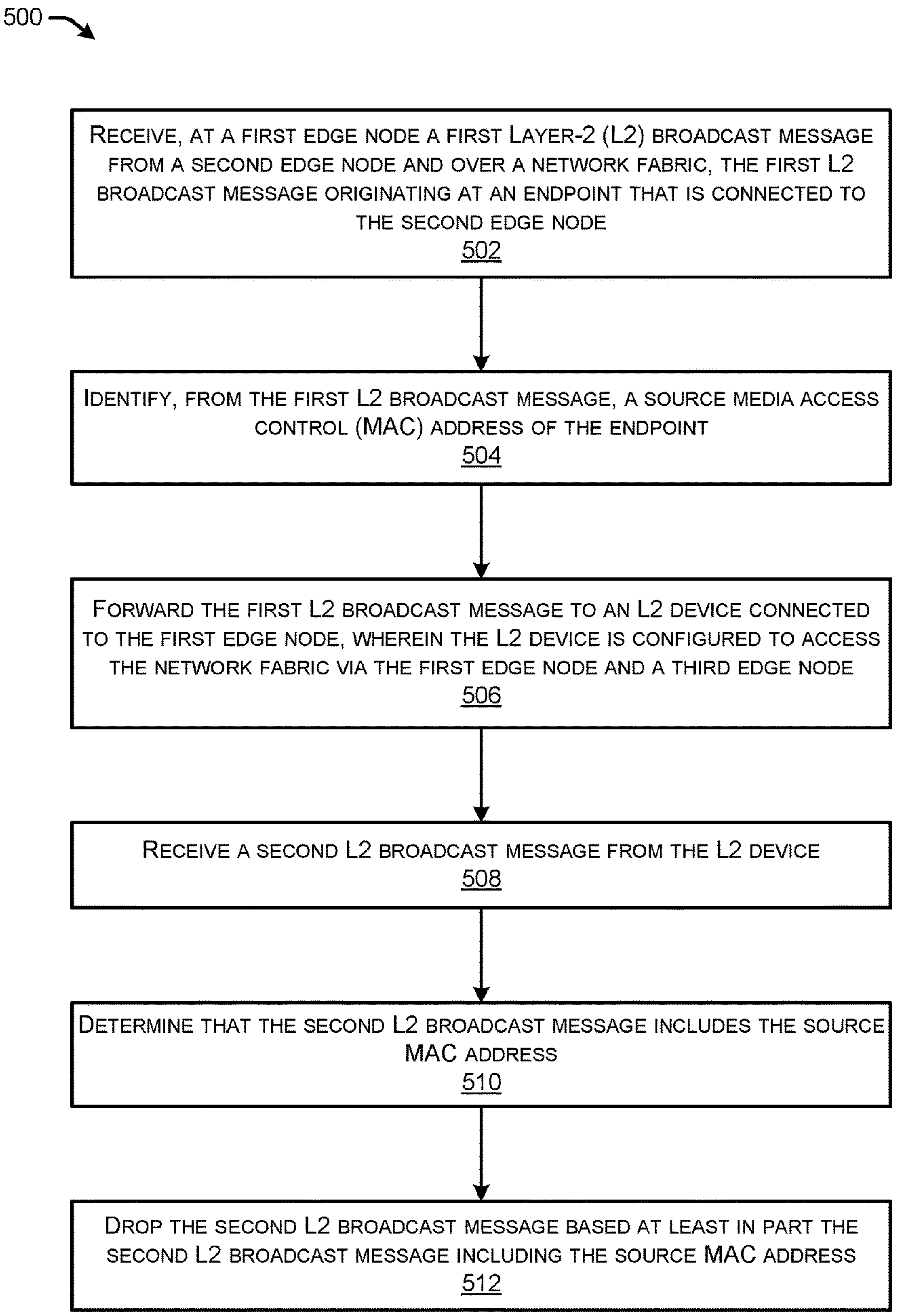
FIG. 5 illustrates a flow diagram of an example method for an edge node in a network fabric to determine that a L2 broadcast message has already been communicated with dual-homed endpoints connected to the network fabric, and dropping the L2 broadcast message.

FIGS. 4A, 4B, and 5 illustrate flow diagrams of example methods 400 and 500 that illustrate aspects of the functions performed at least partly by the devices in the distributed application architecture as described in FIGS. 1-3B. The logical operations described herein with respect to FIGS. 4A, 4B, and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4A, 4B, and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, or different arrangements of components.

FIGS. 4A and 4B collectively illustrate a flow diagram of an example method 400 for edge nodes 105 in a network fabric 102 to determine whether L2 broadcast messages 108 have already been communicated with dual-homed endpoints connected to the network fabric 102.

At 402, the first edge node 105 may receive a first Layer-2 (L2) broadcast message 108 from a second edge node (e.g., remote edge node 104) and over the network fabric 102. In some examples, the first L2 broadcast message 108 originates at an endpoint (e.g., source endpoint 106) that is connected to the second edge node.

At 404, the first edge node 105 may identify, from the first L2 broadcast message 108, a first source media access control (MAC) address 110 of the endpoint. At 406, the edge node 105 may store the first source MAC address 110 of the first L2 broadcast message 108 in a local cache (e.g., map-cache 224) of the first edge node 105.

At 408, the first edge node 105 may forward the first L2 broadcast message 108 to an L2 device (e.g., L2 switch 114) connected to the first edge node 105, where the L2 switch 114 (or other device) is configured to access the network fabric 102 via the first edge node 105(1) and a third edge node 105(2).

At 410, the first edge node 105 may receive a second L2 broadcast message from the L2 device. At 412, the first edge node 105 may identify, from the second L2 broadcast message, a second source MAC address and a destination MAC address 112 that is a broadcast address (e.g., FF-FF-FF-FF-FF-FF). At 414, the first edge node 105 may determine whether the second source MAC address corresponds to the first source MAC address stored in the local cache (e.g., comparison with entries in the MAC address table 228).

At 416, the first edge node 105 may, in response to determining that the second source MAC address corresponds to the first source MAC address, drop the second L2 broadcast message.

In some instances, the method 400 may further comprise, in response to determining that the second source MAC address corresponds to the first source MAC address, refraining from adding the second source MAC address to the source MAC address table.

In some instances, the method 400 may further comprise, in response to determining that the second source MAC address corresponds to the first source MAC address, refraining from sending a registration message to a control-plane of the network fabric to register the endpoint with the first edge node.

In some instances, the method 400 may further comprise, in response to determining that the second source MAC address corresponds to the first source MAC address, querying a control-plane of the network fabric to determine whether the endpoint is registered to another edge node of the network fabric, and receiving, from the control-plane, an indication that the endpoint is registered to the second edge node of the network fabric.

In some instances, the method 400 may further comprise, in response to determining that the second source MAC address corresponds to the first source MAC address, adding the second source MAC address to a flood map-cache table stored in the first edge node, wherein the flood map-cache table stores source MAC addresses received in L2 broadcast messages that belong to endpoints which are registered to other edge nodes of the network fabric.

In some instances, the method 400 may further comprise, in response to determining that the second source MAC address corresponds to the first source MAC address, querying a control-plane of the network fabric to determine whether the endpoint is registered to another edge node of the network fabric, receiving, from the control-plane, an indication that the endpoint is not registered to another edge node of the network fabric, and in response to receiving the indication that the second source MAC is not registered to another edge node of the network fabric, removing the second source MAC address from the flood map-cache table.

In some instances, the method 400 may further comprise, in response to determining that the second source MAC address corresponds to the first source MAC address, querying a control-plane of the network fabric to determine whether the endpoint is registered to another edge node of the network fabric, receiving, from the control-plane, an indication that the endpoint is not registered to another edge node of the network fabric, and in response to receiving the indication that the second source MAC is not registered to another edge node of the network fabric, adding the second source MAC address to a source MAC address table corresponding to the L2 device.

At 418, the first edge node 105 may in response to determining that the second source MAC address does not correspond the first source MAC address, add the second source MAC address to a source MAC address table corresponding to the L2 device.

FIG. 5 illustrates a flow diagram of an example method 500 for an edge node 105 in a network fabric 102 to determine that a L2 broadcast message 108 has already been communicated with dual-homed endpoints connected to the network fabric 102, and dropping the L2 broadcast message.

At 502, the first edge node 105 may receive a first Layer-2 (L2) broadcast message 108 from a second edge node (e.g., remote edge node 104) and over the network fabric 102, where the first L2 broadcast message 108 originates at an endpoint (e.g., source endpoint 106) that is connected to the second edge node.

At 504, the first edge node 105 may identify, from the first L2 broadcast message, a source media access control (MAC) address of the endpoint. At 506, the first edge node 105 may forward the first L2 broadcast message to an L2 device connected to the first edge node, wherein the L2 device is configured to access the network fabric via the first edge node and a third edge node.

At 508, the first edge node 105 may receive a second L2 broadcast message from the L2 device. At 510, the first edge node 105 may determine that the second L2 broadcast message includes the source MAC address. At 512, the first edge node 105 may, based at least in part the second L2 broadcast message including the source MAC address, drop the second L2 broadcast message.

Figure 6:
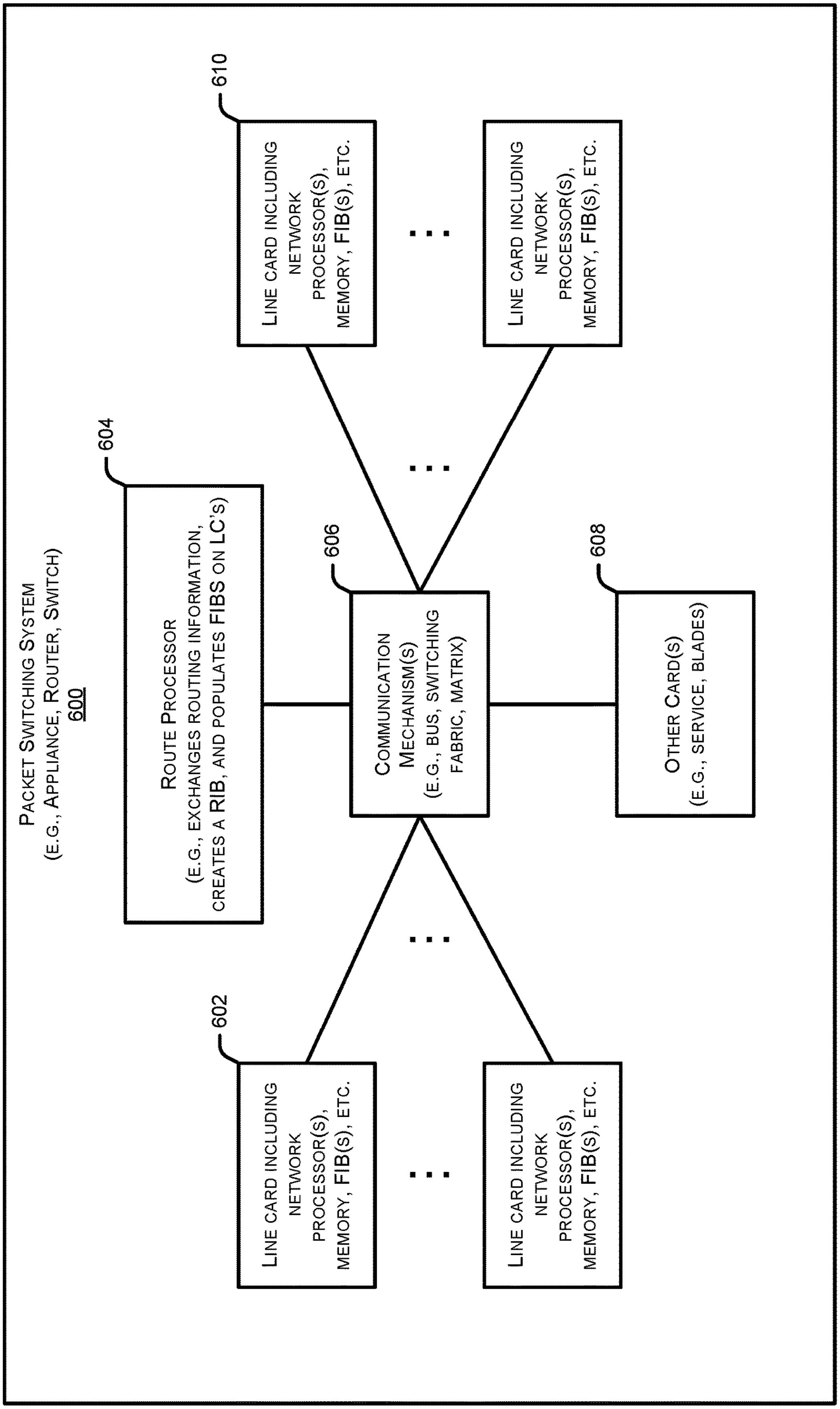
FIG. 6 illustrates a block diagram illustrating an example packet switching system that can be utilized to implement various aspects of the technologies disclosed herein.

FIG. 6 illustrates a block diagram illustrating an example packet switching device (or system) 600 that can be utilized to implement various aspects of the technologies disclosed herein. In some examples, packet switching device(s) 600 may be employed in various networks, such as, as an edge node 104 connected to network fabric 102 as described with respect to FIG. 1.

In some examples, a packet switching device 600 may comprise multiple line card(s) 602, 610, each with one or more network interfaces for sending and receiving packets over communications links (e.g., possibly part of a link aggregation group). The packet switching device 600 may also have a control plane with one or more processing elements 605 for managing the control plane and/or control plane processing of packets associated with forwarding of packets in a network. The packet switching device 600 may also include other cards 608 (e.g., service cards, blades) which include processing elements that are used to process (e.g., forward/send, drop, manipulate, change, modify, receive, create, duplicate, apply a service) packets associated with forwarding of packets in a network. The packet switching device 600 may comprise hardware-based communication mechanism 606 (e.g., bus, switching fabric, and/or matrix, etc.) for allowing its different entities 602, 604, 608 and 610 to communicate. Line card(s) 602, 610 may typically perform the actions of being both an ingress and/or an egress line card 602, 610, in regard to multiple other particular packets and/or packet streams being received by, or sent from, packet switching device 600.

Figure 7:
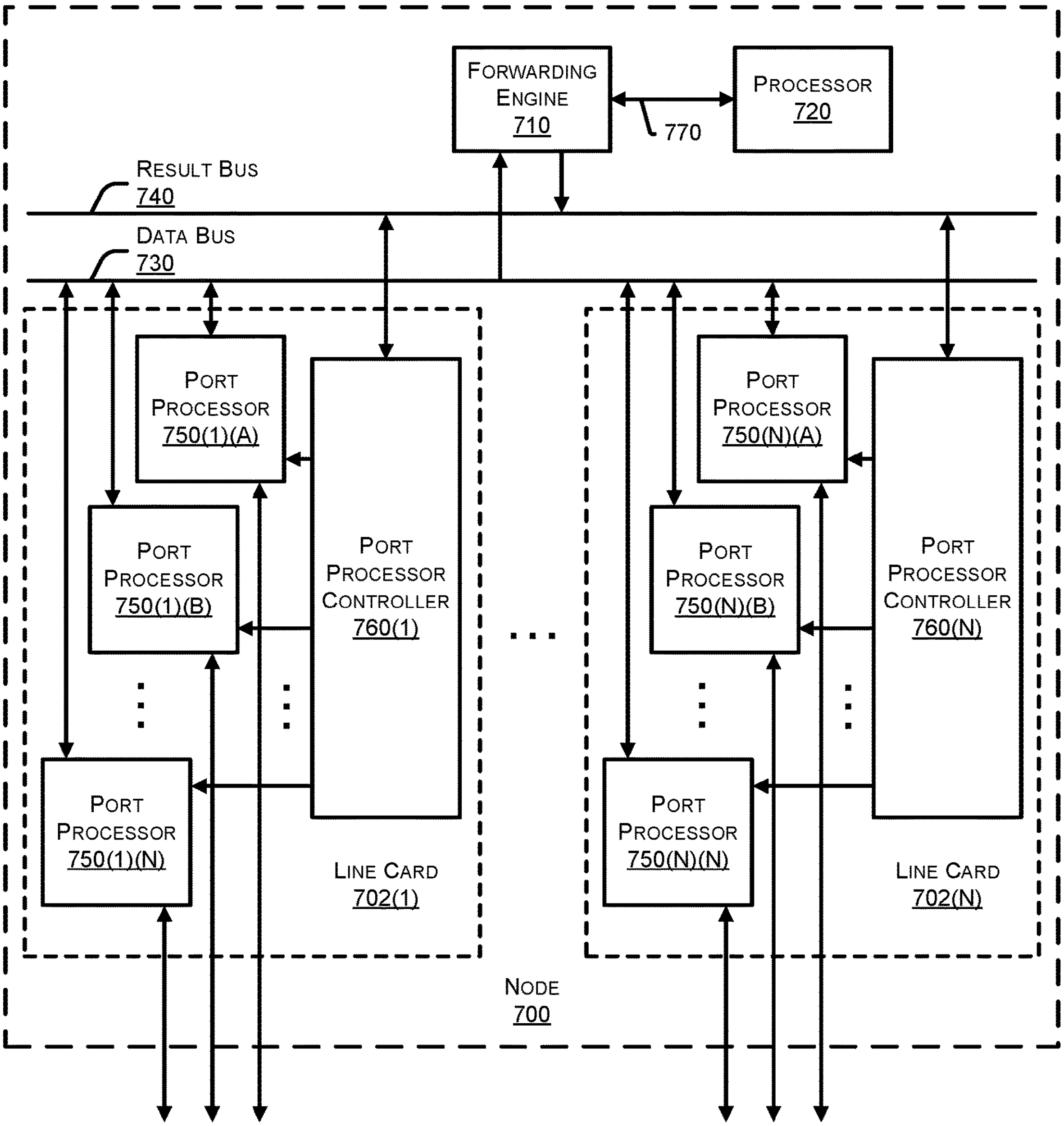
FIG. 7 illustrates a block diagram illustrating certain components of an example node that can be utilized to implement various aspects of the technologies disclosed herein.

FIG. 7 illustrates a block diagram illustrating certain components of an example node 700 that can be utilized to implement various aspects of the technologies disclosed herein. In some examples, node(s) 700 may be employed in various networks, such as, as an edge node 104 connected to network fabric 102 as described with respect to FIG. 1.

In some examples, node 700 may include any number of line cards 702 (e.g., line cards 702(1)-(N), where N may be any integer greater than 1) that are communicatively coupled to a forwarding engine 710 (also referred to as a packet forwarder) and/or a processor 720 via a data bus 730 and/or a result bus 740. Line cards 702(1)-(N) may include any number of port processors 750(1)(A)-(N)(N) which are controlled by port processor controllers 760(1)-(N), where N may be any integer greater than 1. Additionally, or alternatively, forwarding engine 710 and/or processor 720 are not only coupled to one another via the data bus 730 and the result bus 740, but may also communicatively coupled to one another by a communications link 770.

The processors (e.g., the port processor(s) 750 and/or the port processor controller(s) 760) of each line card 702 may be mounted on a single printed circuit board. When a packet or packet and header are received, the packet or packet and header may be identified and analyzed by node 700 (also referred to herein as a router) in the following manner. Upon receipt, a packet (or some or all of its control information) or packet and header may be sent from one of port processor(s) 750(1)(A)-(N)(N) at which the packet or packet and header was received and to one or more of those devices coupled to the data bus 830 (e.g., others of the port processor(s) 750(1)(A)-(N)(N), the forwarding engine 710 and/or the processor 720). Handling of the packet or packet and header may be determined, for example, by the forwarding engine 710. For example, the forwarding engine 710 may determine that the packet or packet and header should be forwarded to one or more of port processors 750(1)(A)-(N)(N). This may be accomplished by indicating to corresponding one(s) of port processor controllers 760(1)-(N) that the copy of the packet or packet and header held in the given one(s) of port processor(s) 750(1)(A)-(N)(N) should be forwarded to the appropriate one of port processor(s) 750(1)(A)-(N)(N). Additionally, or alternatively, once a packet or packet and header has been identified for processing, the forwarding engine 710, the processor 720, and/or the like may be used to process the packet or packet and header in some manner and/or maty add packet security information in order to secure the packet. On a node 700 sourcing such a packet or packet and header, this processing may include, for example, encryption of some or all of the packets or packet and header's information, the addition of a digital signature, and/or some other information and/or processing capable of securing the packet or packet and header. On a node 700 receiving such a processed packet or packet and header, the corresponding process may be performed to recover or validate the packet's or packet and header's information that has been secured.

Figure 8:
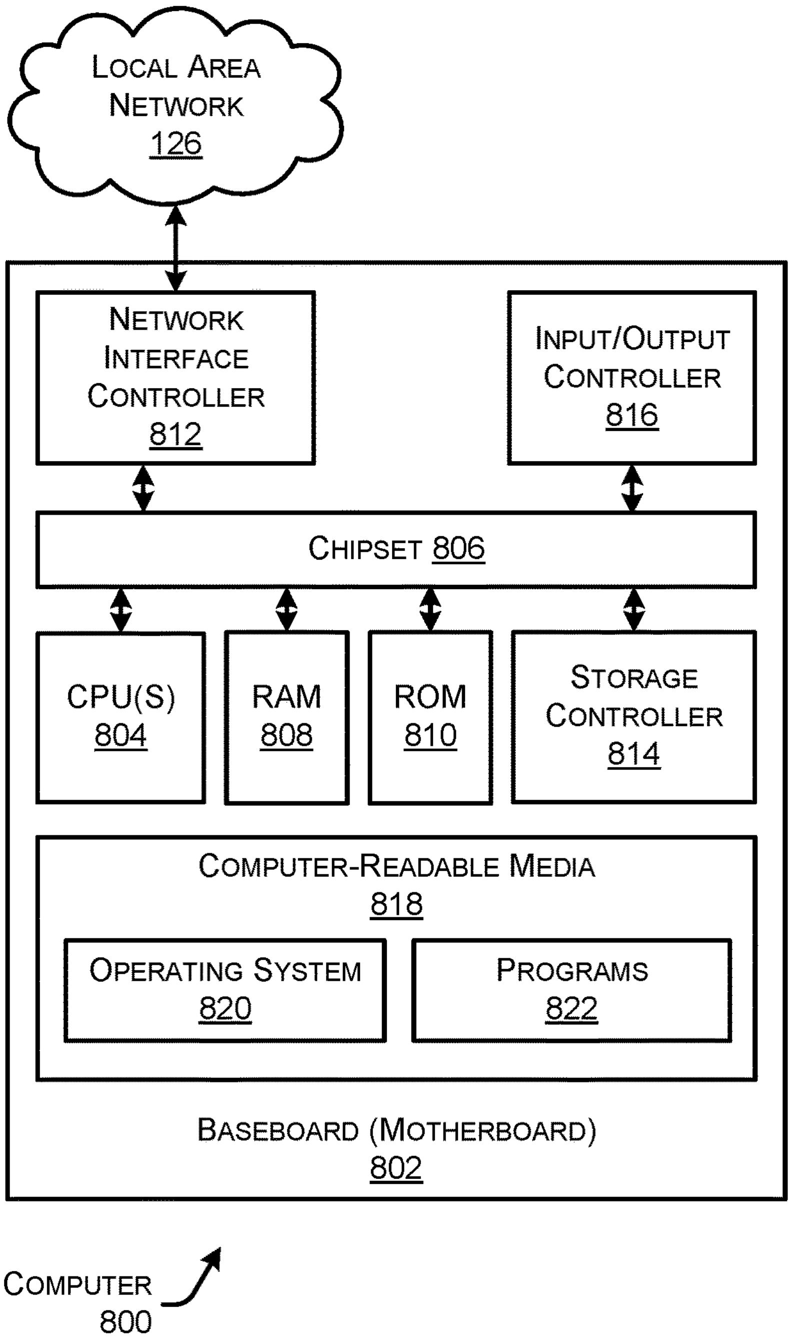
FIG. 8 is a computer architecture diagram showing an illustrative computer hardware architecture for implementing a computing device that can be utilized to implement aspects of the various technologies presented herein.

FIG. 8 is a computer architecture diagram showing an illustrative computer hardware architecture for implementing a computing device that can be utilized to implement aspects of the various technologies presented herein.

The computer architecture shown in FIG. 8 illustrates a conventional server computer, workstation, desktop computer, laptop, tablet, network appliance, e-reader, smartphone, or other computing device, and can be utilized to execute any of the software components presented herein. The computer 800 may, in some examples, correspond to a physical server described herein, and may comprise networked devices such as servers, switches, routers, hubs, bridges, gateways, modems, repeaters, access points, etc.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 126. The chipset 806 can include functionality for providing network connectivity through a NIC 812, such as a gigabit Ethernet adapter. The NIC 812 is capable of connecting the computer 800 to other computing devices over the network 126. It should be appreciated that multiple NICs 812 can be present in the computer 800, connecting the computer to other types of networks and remote computer systems.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by devices in the network fabric, such as the edge nodes 105, and or any components included therein, may be supported by one or more devices similar to computer 800. Stated otherwise, some or all of the operations performed by the devices in the network fabric 102, and or any components included therein, may be performed by one or more computers 800 operating in any arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-7. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

As described herein, the computer 800 may comprise one or more of a router, load balancer, switch, gateway, and/or another network device. The computer 800 may include one or more hardware processors 804 (processors) configured to execute one or more stored instructions. The processor(s) 804 may comprise one or more cores. Further, the computer 800 may include one or more network interfaces configured to provide communications between the computer 800 and other devices, such as the communications described herein as being performed by the devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for providing an edge node 105 that is capable of performing the techniques described herein. The programs 822 may comprise any type of program that cause the computer 800 to perform techniques for communicating with other devices using any type of protocol or standard usable for determining connectivity.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A first edge node of a network fabric, the first edge node comprising:

one or more processors; and one or more non-transitory computer-readable media storing computer-executable instructions that, when executed by the one or more processors, cause the one or more processors to perform operations comprising:

receiving a first Layer-2 (L2) broadcast message from a second edge node and over the network fabric, the first L2 broadcast message originating at an endpoint that is connected to the second edge node;

identifying, from the first L2 broadcast message, a first source media access control (MAC) address of the endpoint;

storing the first source MAC address of the first L2 broadcast message in a local cache of the first edge node;

forwarding the first L2 broadcast message to an L2 device connected to the first edge node, wherein the L2 device is configured to access the network fabric via the first edge node and a third edge node;

receiving a second L2 broadcast message from the L2 device;

identifying, from the second L2 broadcast message, a second source MAC address and a destination MAC address that is a broadcast address;

determining whether the second source MAC address corresponds to the first source MAC address stored in the local cache;

in response to determining that the second source MAC address corresponds to the first source MAC address;

dropping the second L2 broadcast message;

querying a control-plane of the network fabric to determine whether the endpoint is registered to another edge node of the network fabric;

receiving, from the control-plane, an indication that the endpoint is not registered to another edge node of the network fabric; and in response to receiving the indication that the second source MAC is not registered to another edge node of the network fabric, adding the second source MAC address to a source MAC address table corresponding to the L2 device.

2. The first edge node of claim 1, the operations further comprising, in response to determining that the second source MAC address corresponds to the first source MAC address, refraining from adding the second source MAC address to the source MAC address table.

3. The first edge node of claim 1, the operations further comprising, in response to determining that the second source MAC address corresponds to the first source MAC address, refraining from sending a registration message to a control-plane of the network fabric to register the endpoint with the first edge node.

4. The first edge node of claim 1, the operations further comprising, in response to determining that the second source MAC address corresponds to the first source MAC address:

querying a control-plane of the network fabric to determine whether the endpoint is registered to another edge node of the network fabric; and receiving, from the control-plane, an indication that the endpoint is registered to the second edge node of the network fabric.

5. The first edge node of claim 1, the operations further comprising, in response to determining that the second source MAC address corresponds to the first source MAC address:

adding the second source MAC address to a flood map-cache table stored in the first edge node, wherein the flood map-cache table stores source MAC addresses received in L2 broadcast messages that belong to endpoints which are registered to other edge nodes of the network fabric.

6. The first edge node of claim 5, the operations further comprising, in response to determining that the second source MAC address corresponds to the first source MAC address:

querying a control-plane of the network fabric to determine whether the endpoint is registered to another edge node of the network fabric;

receiving, from the control-plane, an indication that the endpoint is not registered to another edge node of the network fabric; and in response to receiving the indication that the second source MAC is not registered to another edge node of the network fabric, removing the second source MAC address from the flood map-cache table.

7. The first edge node of claim 1, wherein:

the network fabric is a software-defined access (SDA) fabric; and the SDA fabric is associated with a Locator/Identifier Separation Protocol (LISP) control plane.

8. The first edge node of claim 1, wherein:

the network fabric includes an Ethernet Virtual Private Network (EVPN) fabric; and the EVPN fabric is associated with a Border Gateway Protocol (BGP) control plane that includes a route reflector.

9. A computer-implemented method performed by a first edge node of a network fabric, the method comprising:

receiving a first Layer-2 (L2) broadcast message from a second edge node and over the network fabric, the first L2 broadcast message originating at an endpoint that is connected to the second edge node;

identifying, from the first L2 broadcast message, a first source media access control (MAC) address of the endpoint;

storing the first source MAC address of the first L2 broadcast message in a local cache of the first edge node;

forwarding the first L2 broadcast message to an L2 device connected to the first edge node, wherein the L2 device is configured to access the network fabric via the first edge node and a third edge node;

receiving a second L2 broadcast message from the L2 device;

identifying, from the second L2 broadcast message, a second source MAC address and a destination MAC address that is a broadcast address;

determining whether the second source MAC address corresponds to the first source MAC address stored in the local cache;

in response to determining that the second source MAC address corresponds to the first source MAC address, dropping the second L2 broadcast message; and in response to determining that the second source MAC address corresponds to the first source MAC address, refraining from adding the second source MAC address to a source MAC address table.

10. The computer-implemented method of claim 9, further comprising, in response to determining that the second source MAC address corresponds to the first source MAC address, refraining from sending a registration message to a control-plane of the network fabric to register the endpoint with the first edge node.

11. The computer-implemented method of claim 9, further comprising, in response to determining that the second source MAC address corresponds to the first source MAC address:

querying a control-plane of the network fabric to determine whether the endpoint is registered to another edge node of the network fabric; and receiving, from the control-plane, an indication that the endpoint is registered to the second edge node of the network fabric.

12. The computer-implemented method of claim 9, further comprising, in response to determining that the second source MAC address corresponds to the first source MAC address:

adding the second source MAC address to a flood map-cache table stored in the first edge node, wherein the flood map-cache table stores source MAC addresses received in L2 broadcast messages that belong to endpoints which are registered to other edge nodes of the network fabric.

13. The computer-implemented method of claim 12, further comprising, in response to determining that the second source MAC address corresponds to the first source MAC address:

querying a control-plane of the network fabric to determine whether the endpoint is registered to another edge node of the network fabric;

receiving, from the control-plane, an indication that the endpoint is not registered to another edge node of the network fabric; and in response to receiving the indication that the second source MAC is not registered to another edge node of the network fabric, removing the second source MAC address from the flood map-cache table.

14. The computer-implemented method of claim 9, further comprising, in response to determining that the second source MAC address corresponds to the first source MAC address:

querying a control-plane of the network fabric to determine whether the endpoint is registered to another edge node of the network fabric;

receiving, from the control-plane, an indication that the endpoint is not registered to another edge node of the network fabric; and in response to receiving the indication that the second source MAC is not registered to another edge node of the network fabric, adding the second source MAC address to a source MAC address table corresponding to the L2 device.

15. A computer-implemented method performed by a first edge node of a network fabric, the method comprising:

receiving a first Layer-2 (L2) broadcast message from a second edge node and over the network fabric, the first L2 broadcast message originating at an endpoint that is connected to the second edge node;

identifying, from the first L2 broadcast message, a source media access control (MAC) address of the endpoint;

forwarding the first L2 broadcast message to an L2 device connected to the first edge node, wherein the L2 device is configured to access the network fabric via the first edge node and a third edge node;

receiving a second L2 broadcast message from the L2 device;

determining that the second L2 broadcast message includes the source MAC address;

based at least in part the second L2 broadcast message including the source MAC address, dropping the second L2 broadcast message; and refraining from sending a registration message to a control-plane of the network fabric to register the endpoint with the first edge node.

16. The computer-implemented method of claim 15, further comprising refraining from adding the source MAC address to a source MAC address table corresponding to the L2 device.

17. The computer-implemented method of claim 15, further comprising:

querying a control-plane of the network fabric to determine whether the endpoint is registered to another edge node of the network fabric; and receiving, from the control-plane, an indication that the endpoint is registered to the second edge node of the network fabric.

* * * * *